Patented July 14, 1931

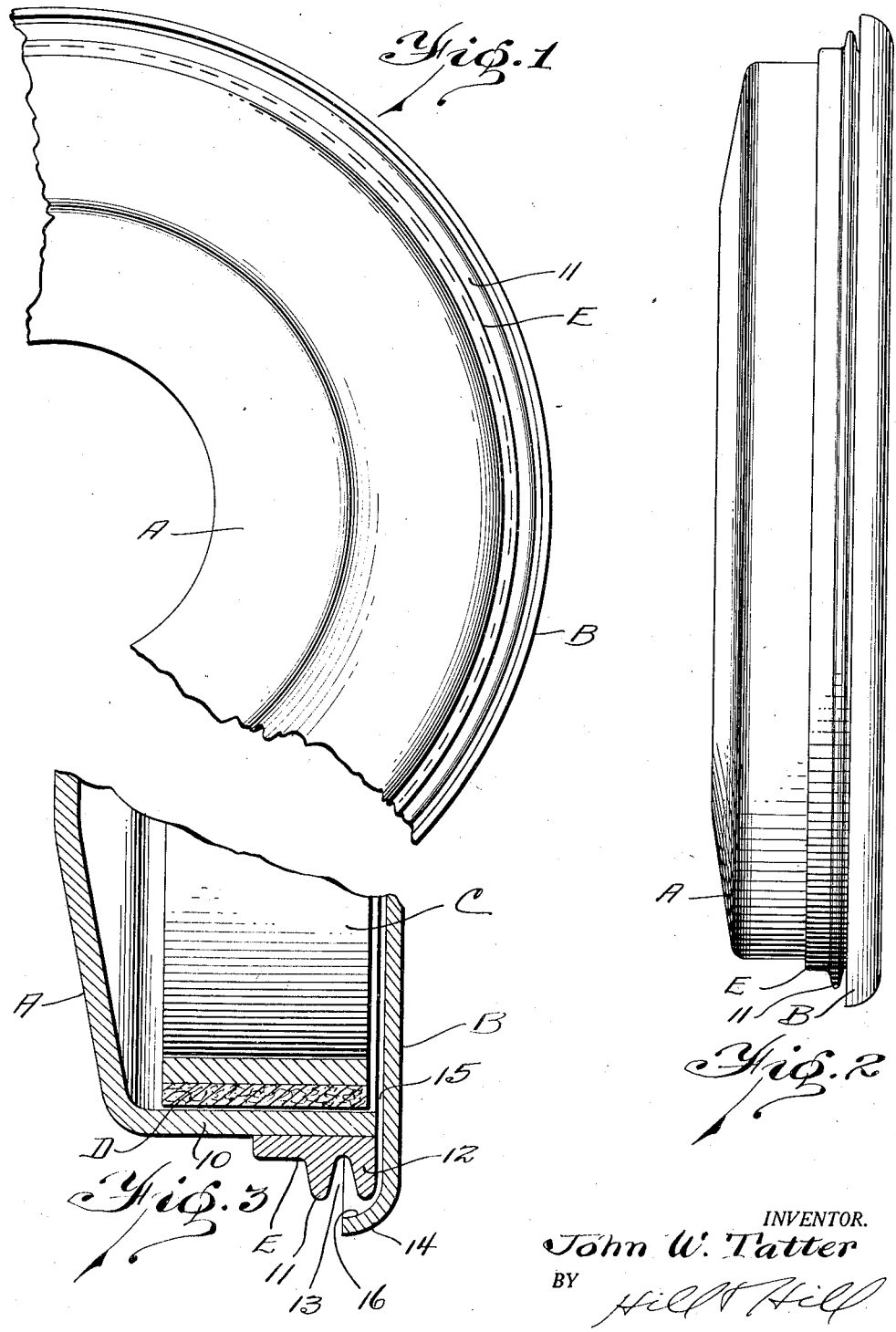

1,814,575

UNITED STATES PATENT OFFICE

JOHN W. TATTER, OF CHICAGO, ILLINOIS, ASSIGNOR TO LEWIS DIFFERENTIAL COMPANY, OF CHICAGO, ILLINOIS, A CORPORATION OF ILLINOIS

BRAKE

Application filed October 29, 1928. Serial No. 315,743.

This invention relates to brakes and refers more particularly to an improved sealing construction especially adapted for use in connection with internal vehicle brake mechanisms.

It is generally known that water and other foreign substances tend to find their way into the brake casing or brake drum resulting in inefficient braking action. This is especially true in the case of water which tends to splash or run into the brake drum and in contact with the brake lining. The conventional vehicle brake is known to be inefficient when driving on wet roadways.

One object of my invention resides in the provision of baffling or water intercepting means whereby water and other foreign substances will be practically prevented from passage into the brake drum whereby the brake lining will act efficiently when driving on wet roadways as well as on dry roadways.

A further object of my invention resides in a brake drum sealing structure of simple construction, capable of manufacture at relatively low cost, and capable of ready assembly with the associated parts.

Further objects and advantages of my invention will be apparent from the following description of certain illustrated embodiments including the particular combination and arrangement of parts as shown and claimed.

Referring to the accompanying drawings which illustrate one embodiment of my invention, Fig. 1 is a fragmentary side elevation view of my brake drum assembly, Fig. 2 is an end or edge elevation view thereof, and Fig. 3 is an enlarged detail cross sectional view showing the brake drum deflecting baffles and associated parts.

In the drawings reference character A represents the brake drum, B the backing plate, C the brake band, and D the brake lining. In the illustration the brake band C is of the internal expanding type, any suitable mechanism (not shown) being employed to expand the band and lining D into braking contact with the drum flange 10. It is understood that in accordance with common practice the drum A may rotate with the usual vehicle wheel (not shown) while the parts B, C, and D are non-rotative. For simplicity and convenience of disclosure the mountings and actuating mechanisms are omitted.

In order to prevent water and other foreign substances from entering the brake drum, the flange 10 has mounted thereon a baffle element or water intercepting band E preferably formed separate from the drum A and secured around the flange 10 adjacent the inner end thereof by suitable fastening means. In practice I prefer to secure the band E in position by shrinking the same in place, whereby the drum A may be easily and cheaply fashioned. The band E may if desired be formed from rolled stock, bent into circular form with the ends welded, and then shrunk on the drum flange 10 as aforesaid. In some instances it may be preferred to form the band E integral with the flange 10 and I do not limit my invention in its broader aspects to the particular form disclosed in Fig. 3 wherein the band E is separate from the drum A.

The band E preferably has a plurality of outwardly extending annular baffles 11, 12 spaced at 13 axially of the drum. The backing plate B seals or closes the open side of drum A and is provided with a peripheral flange 14 which cooperates with deflectors 11 and 12. Thus the flange 14 closely overlies the inner baffle 12 and preferably terminates opposite the space 13 and beyond the outermost edge of baffle 12 whereby the plate B may be conveniently assembled.

In operation, foreign substances and particularly water carried outwardly of the drum exterior by centrifugal force occasioned by rotation of the drum will for the most part be thrown outwardly away from the drum by the baffle 11. Should any water find its way past the baffle 11 such water will be thrown off the baffle 12 and for the most part guided outwardly away from the clearance space 15 between the drum A and plate B. In order to facilitate this action the flange 14 may be curved inwardly and outwardly at 16 from baffle 12 opposite the space 13. The construction furthermore prevents the splashing of water past the space 15 and results in a brake of high efficiency under all conditions.

Various modifications may be resorted to without departing from the teachings of my invention and I therefore do not desire to limit my invention except as specifically set forth in the appended claims.

What I claim as my invention is:

1. A device of the class described comprising in combination, a brake drum, a closure plate, a band having a plurality of baffles carried by the drum, said closure plate having an edge portion curving inwardly of the drum and outwardly over one of said baffles, said edge portion terminating short of the other of said baffles.

2. In a brake, a drum having an annular flange, an internal band acting on said drum flange, a drum closure element, and a band carried by the drum adjacent the edge thereof, said second band having a pair of spaced outwardly extending baffles, said closure element provided with an outer edge bent around one of said baffles and terminating substantially opposite the space between said baffles.

3. In a brake, a rotatable drum having a flange, a brake element acting on said flange, annular baffles carried by the drum flange, and a brake drum closure element provided with a peripheral curved portion cooperating with one of said baffles for deflecting water thrown outwardly by said baffle away from the edge of said drum flange.

In witness whereof, I hereunto subscribe my name this 6th day of October, 1928.

JOHN W. TATTER.